United States Patent
Okamoto et al.

(10) Patent No.: US 10,364,742 B2
(45) Date of Patent: Jul. 30, 2019

(54) CONTROL DEVICE AND CONTROL METHOD FOR VEHICLE DRIVE MECHANISM

(71) Applicant: Hitachi Automotive Systems, Ltd., Hitachinaka-shi, Ibaraki (JP)

(72) Inventors: Naoki Okamoto, Isesaki (JP); Yuya Shinozaki, Isesaki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 16/161,635

(22) Filed: Oct. 16, 2018

(65) Prior Publication Data

US 2019/0085762 A1  Mar. 21, 2019

Related U.S. Application Data

(63) Continuation of application No. 15/555,707, filed as application No. PCT/JP2016/056809 on Mar. 4, 2016, now Pat. No. 10,138,806.

(30) Foreign Application Priority Data

Mar. 5, 2015 (JP) ................. 2015-043516

(51) Int. Cl.
*F01L 13/00* (2006.01)
*F02B 75/04* (2006.01)
(Continued)

(52) U.S. Cl.
CPC ............ *F02B 75/048* (2013.01); *F01L 13/00* (2013.01); *F02B 75/045* (2013.01); *F02B 75/32* (2013.01);
(Continued)

(58) Field of Classification Search
CPC ........................................... F02B 75/048
(Continued)

(56) References Cited

U.S. PATENT DOCUMENTS 7,900,797 B1  3/2011  Isogai
8,634,745 B2 *  1/2014  Tomatsu ............ G03G 21/1633
399/110

(Continued)

FOREIGN PATENT DOCUMENTS

EP  3 324 024 A1  5/2018
JP  2002-357135 A  12/2002
(Continued)

OTHER PUBLICATIONS

International Search Report (PCT/ISA/210) issued in PCT Application No. PCT/JP2016/056809 dated May 31, 2016 with English translation (Two (2) pages).
(Continued)

*Primary Examiner* — David Luo
(74) *Attorney, Agent, or Firm* — Crowell & Moring LLP

(57) ABSTRACT

The present invention relates to a control device and to a control method for a vehicle drive mechanism including a moving body having a movability range regulated by two stoppers, and a sensor which senses a position of the moving body. The control device of the present invention learns an output of the sensor corresponding to a contact state of a high-rigidity stopper, and limits, to a lower level, an operation variable of the actuator for moving the moving body toward a low-rigidity stopper along with an increase in an amount of change in the output of the sensor from the contact state of the high-rigidity stopper. Then, the control device learns the output of the sensor corresponding to the
(Continued)

contact state of the low-rigidity stopper, and controls the actuator based on the output of the sensor learned at both the stopper positions.

5 Claims, 12 Drawing Sheets

(51) Int. Cl.
*F02B 75/32* (2006.01)
*F02D 13/02* (2006.01)
*F02D 15/02* (2006.01)
*F02D 41/24* (2006.01)
*F02D 45/00* (2006.01)
*G05B 13/02* (2006.01)

(52) U.S. Cl.
CPC ............. *F02D 13/02* (2013.01); *F02D 15/02* (2013.01); *F02D 41/2474* (2013.01); *F02D 45/00* (2013.01); *G05B 13/0265* (2013.01); *F01L 2800/09* (2013.01); *F02D 2250/16* (2013.01); *F02D 2700/03* (2013.01)

(58) Field of Classification Search
USPC .................................................. 318/561, 560
See application file for complete search history.

(56) References Cited

U.S. PATENT DOCUMENTS

| | | |
|---|---|---|
| 2002/0189563 A1 | 12/2002 | Muraki et al. |
| 2003/0140624 A1 | 7/2003 | Tatsukawa |
| 2014/0338307 A1 | 11/2014 | Kokotovic et al. |

FOREIGN PATENT DOCUMENTS

| | | |
|---|---|---|
| JP | 2007-45394 A | 2/2007 |
| JP | 2008-215247 A | 9/2008 |
| JP | 2012-251446 A | 12/2012 |
| WO | WO 2009/131811 A1 | 10/2009 |

OTHER PUBLICATIONS

Japanese-language Written Opinion Report (PCT/ISA/237) issued in PCT Application No. PCT/JP2016/056809 dated May 31, 2016 with English translation (Six (6) pages).
International Preliminary Report on Patentability (PCT/IB/338 & PCT/IB/373) issued in PCT Application No. PCT/JP2016/056809 dated Sep. 14, 2017 including English translation of document C2 (Japanese-language Written Opinion (PCT/ISA/237) dated May 31, 2016) previously filed on Sep. 5, 2017 (Five (5) pages).
Supplementary European Search Report issued in counterpart European Application No. 16759037.1 dated Jul. 19, 2018 (nine (9) pages).
European Office Action issued in counterpart European Application No. 16 759 037.1 dated May 28, 2019 (four pages).

* cited by examiner

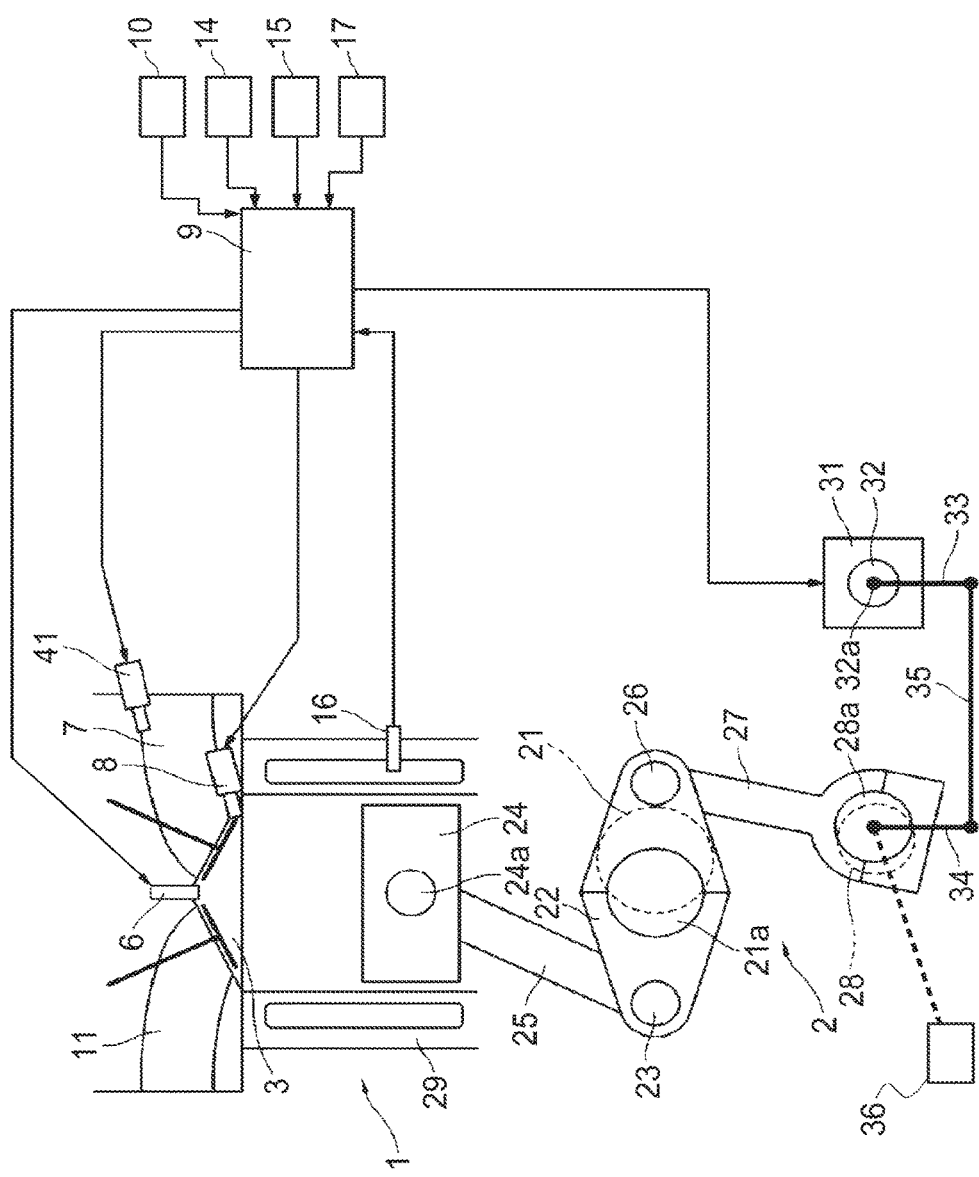

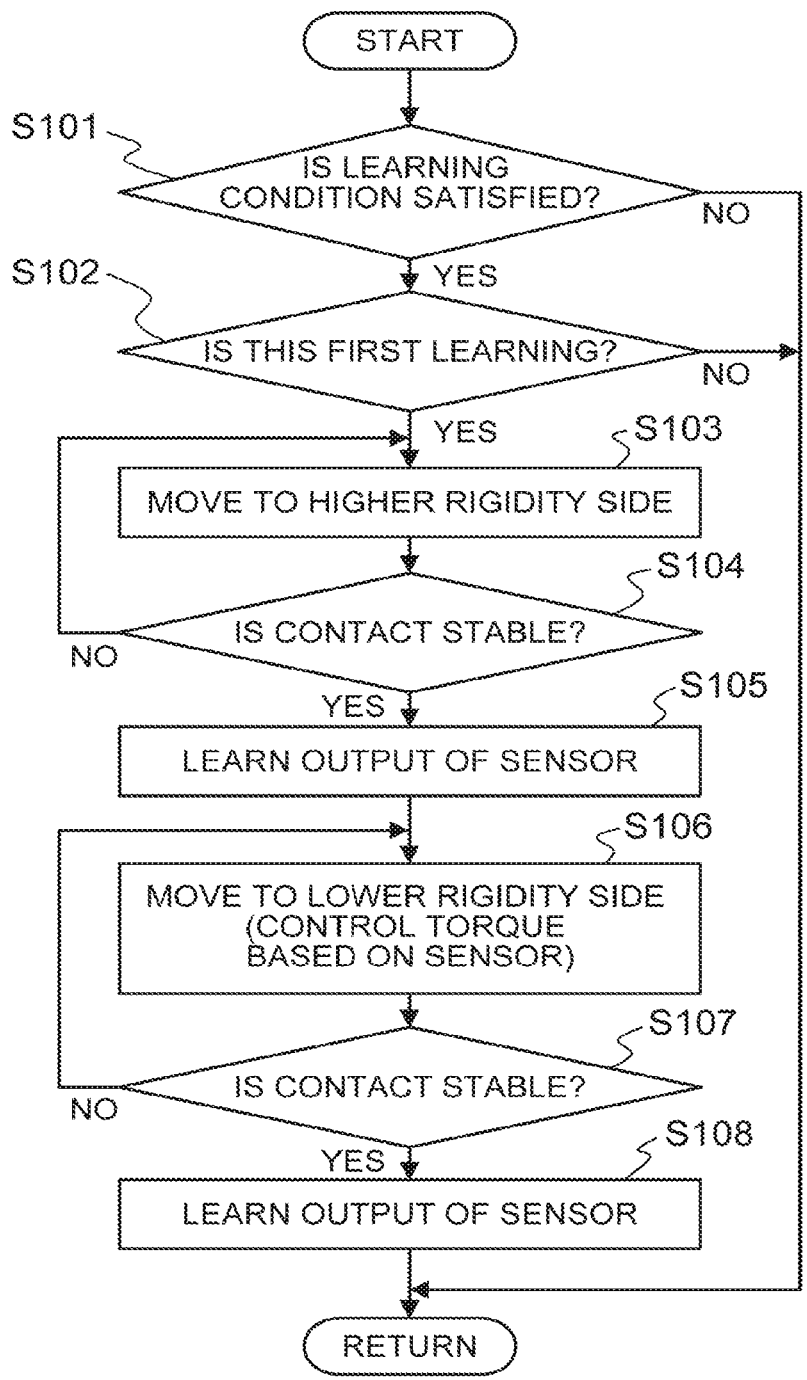

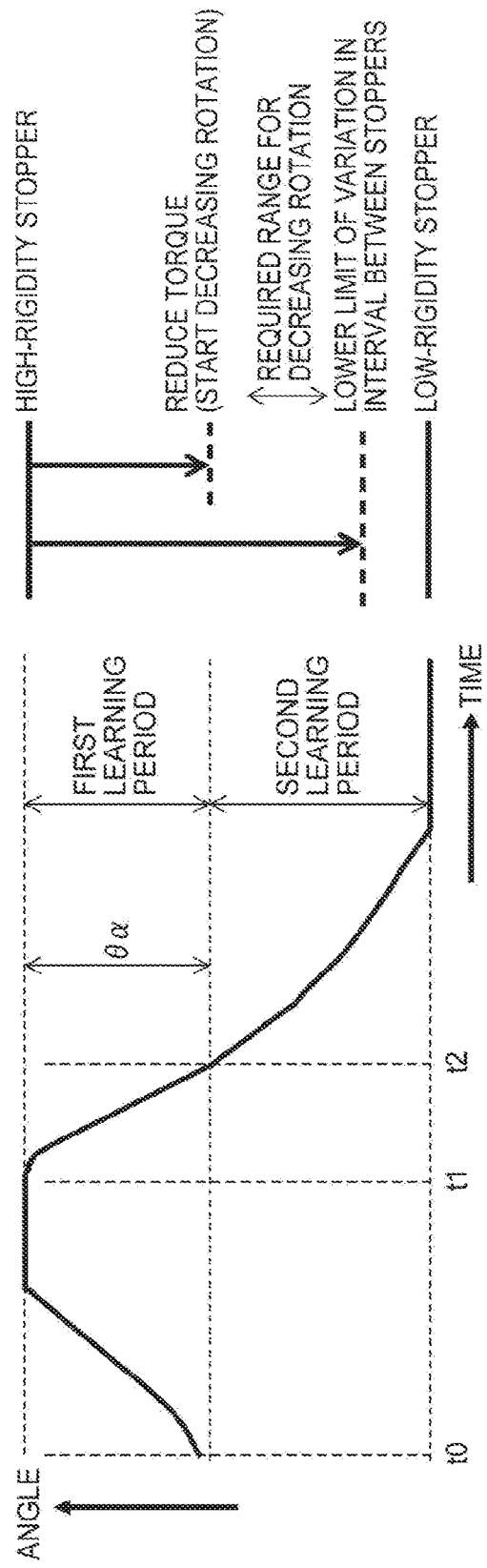

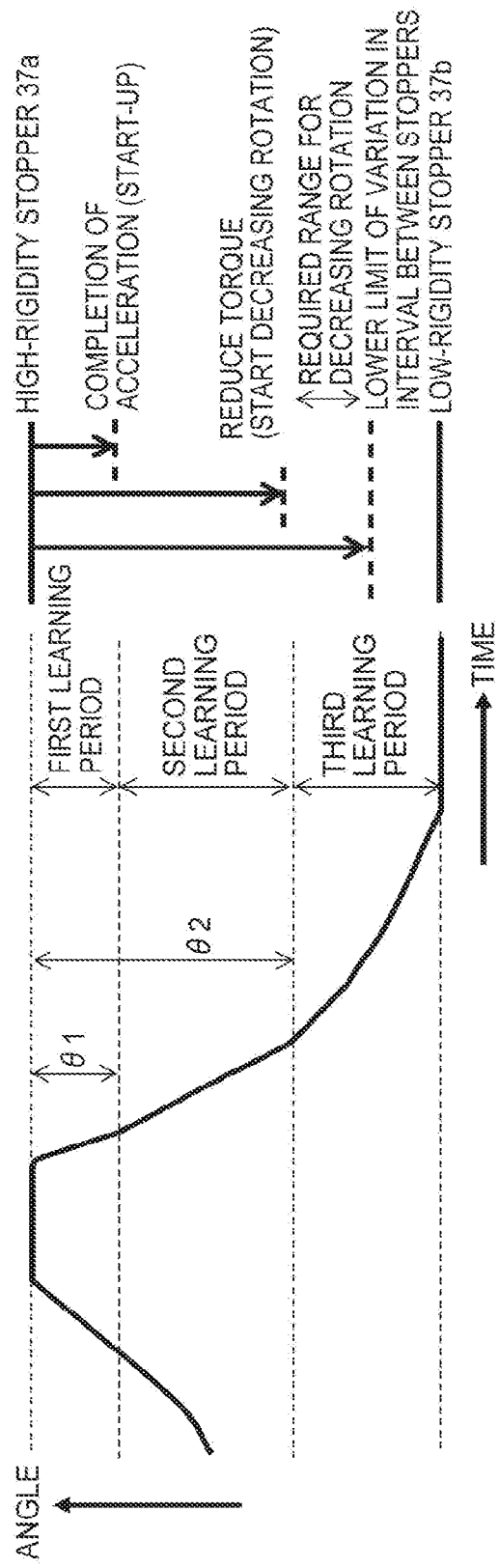

CONTROL DEVICE AND CONTROL METHOD FOR VEHICLE DRIVE MECHANISM

CROSS REFERENCE TO RELATED APPLICATIONS

This application is a continuation of U.S. application Ser. No. 15/555,707, filed Sep. 5, 2017, which is a 371 of International Application No. PCT/JP2016/056809, filed Mar. 4, 2016, which claims priority from Japanese Patent Application No. 2015-043516, filed Mar. 5, 2015, the disclosures of which are expressly incorporated by reference herein.

TECHNICAL FIELD

The present invention relates to a control device and control method for a vehicle drive mechanism, and in particular, relates to a technique for identifying a position of a moving body having a movability range with two ends, each end defined by a stopper.

BACKGROUND ART

Patent Document 1 discloses a variable compression ratio mechanism capable of changing an engine compression ratio by causing an actuator to change a rotation position of a control shaft so as to change at least one of the top dead center position and the bottom dead center position of pistons in an internal combustion engine.

Patent Document 2 discloses a control device for an electric power steering apparatus, including a rack end determination unit for determining whether a steering wheel comes close to a rack end, or a steering limit determination unit for determining whether the steering wheel has reached a steering limit. The control device limits an electric current command value when the steering wheel has come close to the rack end or has reached the steering limit, and applies an electromagnetic brake to a motor at a timing when the electric current command value thus limited becomes zero.

REFERENCE DOCUMENT LIST

Patent Documents

Patent Document 1: JP 2012-251446 A
Patent Document 2: JP 2007-045394 A

SUMMARY OF THE INVENTION

Problems to be Solved by the Invention

For example, in some vehicle drive mechanisms, such as a variable compression ratio mechanism, for changing a control variable depending on an angle of a control shaft, and using a stopper to limit rotation of the control shaft, a signal output from a sensor for sensing the angle of the control shaft is learned at a position where the control shaft is in contact with the stopper, and the angle of the control shaft is controlled based on the learned output of the sensor.

In this learning processing, bringing the control shaft into contact with the stopper at an increased rotation speed makes it possible to shorten the time required for the learning. However, when the control shaft is brought into contact with the stopper at an increased rotation speed of the control shaft, a significant impact force is added to the stopper.

Accordingly, when the stopper has a low rigidity, the following problems can occur. Bringing the control shaft into contact with the stopper at an increased rotation speed in order to shorten the learning time may possibly cause damage to the stopper. On the other hand, lowering the rotation speed in order to prevent such damage to the stopper will increase the learning time.

Here, controlling the control shaft so as to rotate the control shaft fast until immediately before coming into contact with the stopper, and then bring the control shaft into contact with the stopper at a reduced motor torque makes it possible to shorten the learning time while mitigating the impact force of the contact.

However, in the first round of the learning processing, that is, with no experience of learning the output of the sensor related to the stopper position, such as immediately after the sensor is installed, the position where the control shaft comes into contact with the stopper may greatly vary due to poor installation or the like.

Thus, in order to prevent the control shaft from coming into contact with the stopper before torque limitation starts, it is necessary to advance the timing for changing the motor torque to a lower level. However, this leads to a problem that the learning time is not able to be shortened as much as possible.

The present invention has been made in consideration of these problems, and an object thereof is to provide a control device and control method for a vehicle drive mechanism, which are capable of learning an output of a sensor at a stopper position in as short a time as possible while limiting the impact force of contact to be within a permissible range, even in the first round of learning.

Means for Solving the Problems

To this end, according to the present invention, there is provided a control device for a vehicle drive mechanism including a moving body which is movably supported, two stoppers, each of which defines an end of a movability range of the moving body, an actuator which drives the moving body in a moving direction, and a sensor which senses a position of the moving body. The control device comprises a learning unit that learns an output of the sensor corresponding to a contact state of each of the two stoppers. The learning unit executes the learning for a high-rigidity stopper of the two stoppers prior to the learning for a low-rigidity stopper of the two stoppers.

In addition, according to the present invention, there is provided a control method for a vehicle drive mechanism including a moving body which is movably supported, two stoppers, each of which defines an end of a movability range of the moving body, an actuator which drives the moving body in a moving direction, and a sensor which senses a position of the moving body. The control method includes: moving the moving body toward a high-rigidity stopper of the two stoppers; learning an output of the sensor corresponding to a contact state of the high-rigidity stopper; moving the moving body toward a low-rigidity stopper of the two stoppers from the contact state of the high-rigidity stopper; limiting, to a lower level, an operation variable of the actuator for moving the moving body toward the low-rigidity stopper from the contact state of the high-rigidity stopper along with an increase in an amount of change in the output of the sensor from the contact state of the high-rigidity stopper; learning the output of the sensor corresponding to the contact state of the low-rigidity stopper; and controlling the actuator based on a learned value of the output of the sensor.

Effects of the Invention

According to the present invention, it is possible to move the moving body toward the stopper contact position at a higher speed during the learning for the high-rigidity stopper than during the learning for the low-rigidity stopper. In addition, after the learning for the high-rigidity stopper, which provides a general correlation between the output of the sensor and the position of the moving body, it is possible to control the actuator so as to bring the low-rigidity stopper into the contact state in as short a time as possible while limiting a contact impact force within a permissible range.

Therefore, the present invention makes it possible to learn the output of the sensor corresponding to the contact state of the stopper in as short a time as possible while limiting a contact impact force within the permissible range, even in the first round of learning.

BRIEF DESCRIPTION OF THE DRAWINGS

FIG. 1 is a system diagram of a vehicle internal combustion engine including a variable compression ratio mechanism according to an embodiment of the present invention.

FIG. 3 is a flow chart illustrating a flow of stopper position learning according to an embodiment of the present invention.

FIG. 4 is a time chart illustrating an example of an angular change and learning periods (timing of changing a limit value) during stopper position learning according to an embodiment of the present invention.

FIG. 8 is a time chart illustrating an example of an angular change and learning periods (timings of changing a limit value) during stopper position learning according to an embodiment of the present invention.

MODES FOR CARRYING OUT THE INVENTION

Figure 2A:
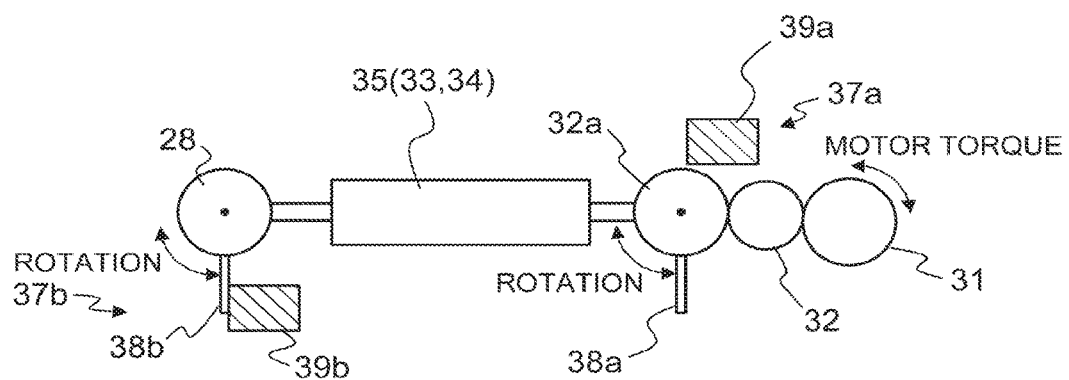
FIGS. 2A and 2B are views illustrating a stopper structure of a variable compression ratio mechanism according to an embodiment of the present invention.

Hereinafter, an embodiment of the present invention will be described.

FIG. 1 illustrates a system configuration of a vehicle internal combustion engine 1 including a variable compression ratio mechanism that is an example of a vehicle drive mechanism to which a control device and control method of the present invention are applied.

Internal combustion engine 1 in FIG. 1 is a four-cycle spark ignition engine including a variable compression ratio mechanism 2 which utilizes a multi-link piston-crank mechanism.

On the ceiling surface of each combustion chamber 3 of internal combustion engine 1, a pair of intake valves 4 and a pair of exhaust valves 5 are disposed. Each spark plug 6 is disposed at a central portion surrounded by intake valves 4 and exhaust valves 5.

Intake valves 4 open and close an intake port 7, and exhaust valves 5 open and close an exhaust port 11.

Below each intake port 7, a fuel injection valve 8 for cylinder injection is disposed so as to directly inject fuel into the corresponding combustion chamber 3. In addition, in each intake port 7, a fuel injection valve 41 for port injection is disposed so as to inject fuel into intake port 7.

Both fuel injection valve 8 for cylinder injection and fuel injection valve 41 for port injection are electromagnetic injection valves or piezoelectric injection valves which are opened when a drive pulse signal is applied. Fuel injection valves 8 and 41 inject fuel as much as the quantity that is substantially proportional to the pulse width of the drive pulse signal.

Internal combustion engine 1 may include either fuel injection valve 41 for port injection or fuel injection valve 8 for cylinder injection.

An engine control unit 9 including a microcomputer receives sensing signals from various sensors such as an airflow sensor 10 sensing the intake air flow rate in internal combustion engine 1, an air-fuel ratio sensor 14 sensing the air-fuel ratio of an air-fuel mixture based on the oxygen concentration in exhaust from internal combustion engine 1, a crank angle sensor 15 sensing the rotation angle of a crankshaft 21, a water temperature sensor 16 sensing the temperature of a coolant in internal combustion engine 1, and an accelerator opening sensor 17 sensing how far an accelerator pedal is pressed by a driver.

Based on the received sensing signals, engine control unit 9 controls the fuel injection amount and the injection timings of fuel injection valves 8 and 41, and the ignition timings of spark plugs 6.

Variable compression ratio mechanism 2, which is an example of the vehicle drive mechanism, uses a known multi-link piston-crank mechanism.

Variable compression ratio mechanism 2 mainly includes lower links 22, upper links 25, control links 27, and a control shaft (first control shaft, first moving body) 28. Lower links 22 are rotatably supported by crankpins 21a of crankshaft 21. Each upper link 25 interlinks an upper pin 23 at one end part of the corresponding lower link 22 with a piston pin 24a of the corresponding piston 24. One end of each control link 27 is interlinked with a control pin 26 at the other end part of the corresponding lower link 22. Control shaft 28 swingably supports the other ends of control links 27.

Crankshaft 21 and control shaft 28 are rotatably supported by a bearing structure (not illustrated in the drawings) inside a crankcase below a cylinder block 29.

Control shaft 28 has eccentric shaft parts 28a, and the positions of eccentric shaft parts 28a change as control shaft 28 rotates. The end part of each control link 27 is rotatably fitted to the corresponding eccentric shaft part 28a.

In variable compression ratio mechanism 2 having the above structure, as control shaft 28 rotates, the position of the top dead center of pistons 24 is vertically displaced so that the mechanical compression ratio of internal combustion engine 1 changes.

In addition, as a drive device for driving control shaft 28 in the rotational direction, an electric motor (actuator) 31 having a rotational center axis parallel to crankshaft 21 is disposed below cylinder block 29. A decelerator 32 is connected to electric motor 31 so that they are arranged in series in the axial direction.

An output shaft (second control shaft, second moving body) 32a of decelerator 32 is positioned coaxially with an output shaft (not illustrated in the drawings) of electric motor 31.

Thus, output shaft 32a and control shaft 28 are positioned so as to be parallel to each other. In order to rotate both the shafts in conjunction with each other, a first arm 33 fixed to output shaft 32a and a second arm 34 fixed to control shaft 28 are interlinked with each other via an intermediate link 35.

That is, when electric motor 31 rotates, such rotation is decelerated by decelerator 32 and changes the angle of output shaft 32a. The rotation of output shaft 32a of decelerator 32 is then transmitted from first arm 33 to second arm 34 via intermediate link 35, and rotates control shaft 28 to change the angle of control shaft 28. This vertically displaces the position of the top dead center of pistons 24, and changes the mechanical compression ratio of internal combustion engine 1.

In the multi-link piston-crank mechanism example illustrated in FIG. 1, first arm 33 and second arm 34 both extend in the same direction. For example, when output shaft 32a of decelerator 32 rotates clockwise, control shaft 28 also rotates clockwise. However, a link mechanism may have a configuration in which output shaft 32a and control shaft 28 rotate in opposite directions.

Engine control unit 9 computes a target compression ratio of variable compression ratio mechanism 2 based on engine operation conditions (for example, engine load and engine rotation speed), and controls driving of electric motor 31 based on the target compression ratio and an actual compression ratio.

Instead, an alternative configuration may be employed in which a control unit, which is separate from engine control unit 9 and is configured to be able to communicate with engine control unit 9 via CAN or the like, controls driving of electric motor 31 of variable compression ratio mechanism 2.

Here, as the target compression ratio of variable compression ratio mechanism 2, engine control unit 9 computes a target angular position of control shaft 28 (or output shaft 32a). Engine control unit 9 computes an operation variable of electric motor 31 so as to shift, toward the target angular position, an actual angular position obtained based on an output signal from an angle sensor 36 for sensing the angular position of control shaft 28 (or output shaft 32a). Engine control unit 9 controls power supply to electric motor 31 based on the computed operation variable.

In addition, the angular range of movability (movability range) of control shaft 28 (and output shaft 32a) is mechanically limited by stoppers so as to ensure that control shaft 28 does not rotate out of a predetermined angular range corresponding to the adjustable range of the compression ratio.

Specifically, variable compression ratio mechanism 2 includes two stoppers 37a and 37b, each of which defines an end of the angular range within which control shaft 28 (and output shaft 32a) is rotatable. The compression ratio becomes the maximum when control shaft 28 (and output shaft 32a) reaches an angular position corresponding to a contact state of one of stoppers 37a and 37b. The compression ratio becomes the minimum when control shaft 28 (and output shaft 32a) reaches an angular position corresponding to a contact state of the other one of stoppers 37a and 37b.

For example, stopper 37a has a projection part (movable part) 38a and an engagement part (fixed part) 39a, and stopper 37b has a projection part (movable part) 38b and an engagement part (fixed part) 39b. Projection parts 38a and 38b protrude from the outer circumference of control shaft 28 and/or output shaft 32a. Engagement parts 39a and 39b are provided in cylinder block 29 or the like so as to be located respectively in movement spaces of projection parts 38a and 38b. As projection parts 38a and 38b turn around the shafts, projection parts 38a and 38b move toward or away from engagement parts 39a and 39b. The contact of projection part 38a with engagement part 39a as well as the contact of projection part 38b with engagement part 39b limit rotation (movement) of control shaft 28 (and output shaft 32a).

Figure 2B:
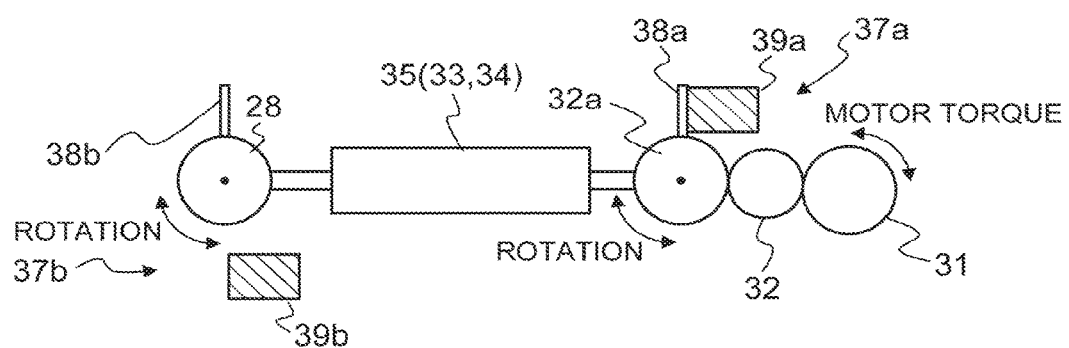

FIGS. 2A and 2B illustrate an example of a structure of stoppers 37a and 37b.

In the example illustrated in FIGS. 2A and 2B, among stoppers 37a and 37b, one stopper 37a is provided to output shaft 32a, and the other stopper 37b is provided to control shaft 28.

In the stopper structure illustrated in FIGS. 2A and 2B, projection part 38a of stopper 37a is provided integrally with output shaft 32a, and engagement part 39a is disposed in the vicinity of output shaft 32a such that, when projection part 38a turns clockwise, projection part 38a eventually comes into contact with engagement part 39a near the twelve o'clock position in FIGS. 2A and 2B.

In addition, projection part 38b of stopper 37b is provided integrally with control shaft 28, and engagement part 39b is disposed in the vicinity of control shaft 28 such that when projection part 38b turns counterclockwise, projection part 38b eventually comes into contact with engagement part 39b near the six o'clock position in FIGS. 2A and 2B.

FIG. 2A illustrates a state in which projection part 38b of stopper 37b is in contact with engagement part 39b. From this state, control shaft 28 and output shaft 32a are not allowed to further rotate counterclockwise while being allowed to rotate clockwise.

FIG. 2B illustrates the state in which control shaft 28 and output shaft 32a rotate clockwise from the state of FIG. 2A until their rotation angle reaches approximately 180 degrees. In the state of FIG. 2B, projection part 38a of stopper 37a is in contact with engagement part 39a, ensuring that control shaft 28 and output shaft 32a do not further rotate clockwise.

As described above, an angular position corresponding to the contact state of stopper 37a functions as a clockwise rotation limit position for control shaft 28 and output shaft 32a, and an angular position corresponding to the contact state of stopper 37b functions as a counterclockwise rotation limit position for control shaft 28 and output shaft 32a.

Accordingly, an angular range of approximately 180 degrees between the angular position corresponding to the contact state of stopper 37a and the angular position corresponding to the contact state of stopper 37b is an angular range within which control shaft 28 and output shaft 32a are rotatable.

In other words, the maximum compression ratio and the minimum compression ratio are defined by the angular position corresponding to the contact state of stopper 37a and the angular position corresponding to the contact state of stopper 37b. Thus, the compression ratio is variable within the compression ratio range between the compression ratio at the angular position corresponding to the contact state of stopper 37a and the compression ratio at the angular position corresponding to the contact state of stopper 37b.

In the example illustrated in FIGS. 2A and 2B, the angular range of movability of control shaft 28 is set to approximately 180 degrees. However, it is apparent that the angular range of movability is not limited to 180 degrees.

Incidentally, variation in installation location of angle sensor 36, variation in output characteristics of angle sensor 36, and/or the like reduce the accuracy of sensing where the angular position of control shaft 28 and output shaft 32a lies within the angular range of movability, thus deteriorating the control accuracy of the compression ratio.

To address this, engine control unit 9 executes stopper position learning. In the stopper position learning, an output of angle sensor 36 when control shaft 28 and output shaft 32a are at the angular position corresponding to the contact state of stopper 37a and an output of angle sensor 36 when control shaft 28 and output shaft 32a are at the angular position corresponding to the contact state of stopper 37b are sensed and individually stored as reference output values. That is, engine control unit 9 has a software-based function to serve as a learning unit for executing the stopper position learning.

Engine control unit 9 identifies the angle of control shaft 28 (output shaft 32a) based on the output of angle sensor 36 and the reference output values. Based on the identified angle value, engine control unit 9 then computes and outputs the operation variable of electric motor 31 of variable compression ratio mechanism 2.

Processing for the stopper position learning executed by engine control unit 9 will be described in detail below.

The flow chart in FIG. 3 illustrates a flow of the stopper position learning processing executed by engine control unit 9.

In step S101, engine control unit 9 determines whether or not the operation state and the like of internal combustion engine 1 satisfy a learning execution condition. When the learning execution condition is satisfied, the operation proceeds to step S102. Here, for example, a state in which internal combustion engine 1 normally operates within a predetermined operation range after completion of warming up internal combustion engine 1 may be used as the learning execution condition.

In step S102, engine control unit 9 determines whether or not the current round of the stopper position learning is the first round.

The first round of stopper position learning means stopper position learning with no execution history of the stopper position learning for both stoppers 37a and 37b after the installation of angle sensor 36 and with no reference output value thereof determined. Examples of such first round of stopper position learning include stopper position learning executed during an inspection and adjustment process at a vehicle assembly factory, and stopper position learning executed immediately after the replacement of angle sensor 36 at a maintenance shop.

However, the flow is not limited to one in which the operation proceeds to step S103 and the subsequent steps in the first round of learning. The determination processing in step S102 may be omitted. Also, there may be included a means for outputting, to engine control unit 9, a command to execute processing for the first round of learning when an adjustment or replacement of the sensor, the actuator, or the like is performed at a maintenance shop or the like.

When it is determined that the current round of the stopper position learning is the first round, the operation proceeds to step S103. In step S103, engine control unit 9 controls electric motor 31 such that control shaft 28 and output shaft 32a rotate in the rotational direction that brings, into the contact state, one of stoppers 37a and 37b that is stored as a first target stopper for learning.

Here, engine control unit 9 may set, as the target angular position, an angular position that is further than the angular position where the rotation of control shaft 28 and output shaft 32a is stopped by the learning target stopper. Engine control unit 9 drives electric motor 31 in the rotational direction that brings the learning target stopper into the contact state by, for example, controlling electric motor 31 based on the output of angle sensor 36 and this target angular position and by controlling the rotation speed of electric motor 31 so as to achieve a target rotation speed for learning.

Among two stoppers 37a and 37b defining the two ends of the angular range of movability of control shaft 28, a stopper having higher rigidity (having higher impact resistance) has been selected in advance as the first target stopper for learning.

For example, in the stopper structure illustrated in FIGS. 2A and 2B, even if projection part 38a included in stopper 37a has a rigidity comparable to projection part 38b included in stopper 37b, and engagement part 39a included in stopper 37a has a rigidity comparable to engagement part 39b included in stopper 37b, the rigidity of stopper 37b is determined as being lower than the rigidity of stopper 37a since stopper 37b is located further away from electric motor 31 than stopper 37a, and there are more components between electric motor 31 and stopper 37b than between electric motor 31 and stopper 37a.

Therefore, when the stopper structure illustrated in FIGS. 2A and 2B is employed, relatively high-rigidity stopper 37a is selected as the first target stopper for learning.

High-rigidity stopper 37a has a higher impact resistance than low-rigidity stopper 37b, and is thus allowed to be brought into the contact state at a higher speed. Accordingly, stopper 37a allows rotating control shaft 28 from an initial position (angular position of control shaft 28 at the start of learning) to the stopper contact position in a shorter time, thus shortening the learning time.

Thus, in step S103, engine control unit 9 controls electric motor 31 such that control shaft 28 rotates at the highest possible speed that generates an impact force within a range tolerable by relatively high-rigidity stopper 37a.

On the other hand, for example, when stopper position learning is executed for relatively low-rigidity stopper 37b, it is necessary to rotate control shaft 28 toward the contact position at a slower speed (lower torque) than when stopper position learning is executed for stopper 37a since stopper 37b has a reduced resistance to a contact impact as compared to that of stopper 37a by a value corresponding to their difference in rigidity. This increases the time required to rotate control shaft 28 and output shaft 32a to the stopper contact position, thus increasing the learning time.

In addition, stopper position learning in the absence of any previous stopper position learning for either of stoppers 37a and 37b permits wide range of variation in the stopper contact position, thus making it difficult to perform precise control for mitigating a shock, such as reducing the motor torque immediately before the stopper contact position. Thus, it is difficult to execute stopper position learning for stopper 37b having lower rigidity in a short time while sufficiently limiting the contact impact force.

Therefore, in the first round of stopper position learning, engine control unit 9 executes learning for stopper 37a having a higher rigidity and higher impact resistance, that is, stopper 37a which is allowed to be brought into the contact state at a higher rotation speed (higher torque), thus allowing shortening of the time required for being brought into the contact state, among stoppers 37a and 37b.

When control shaft 28 is driven to rotate in the rotational direction that brings stopper 37a into the contact state until projection part 38a comes into contact with engagement part 39a, the rotation of control shaft 28 stops at that position, and the output of angle sensor 36 is maintained substantially constant.

Accordingly, in step S104, engine control unit 9 determines whether or not the output of angle sensor 36 is maintained substantially constant, thereby detecting whether or not stopper 37a is settled in the contact state.

Specifically, when a state in which the current output value of angle sensor 36 is substantially equal to the previous value continues for a predetermined time or more, engine control unit 9 determines that the output of angle sensor 36 is in a settled state.

When it is determined that the output of angle sensor 36 is still changing, the operation returns to step S103. Thereby, engine control unit 9 continues to control driving for bringing stopper 37a to the contact state. After that, when it is determined that the output of angle sensor 36 is maintained substantially constant, the operation proceeds to step S105.

In step S105, engine control unit 9 stores the output value of angle sensor 36 at that time as an output of the sensor related to the position corresponding to the contact state of stopper 37a (related to the upper limit value or the lower limit value of the compression ratio).

Subsequently, the operation proceeds to step S106, in which engine control unit 9 inverts the rotation drive direction of control shaft 28, and controls electric motor 31 such that control shaft 28 rotates from the position corresponding to the contact state of stopper 37a toward the position corresponding to the contact state of stopper 37b.

Here, since stopper 37b has a lower rigidity than stopper 37a, bringing stopper 37b into the contact state at a torque equivalent to the torque at which stopper 37a is brought into the contact state may possibly cause deflection, deformation, or the like of the components of stopper 37b due to a contact impact force. To avoid this, engine control unit 9 executes buffer control for reducing the contact impact force applied to stopper 37b, compared to when stopper 37a is brought into the contact state.

However, if the torque is limited to a value that ensures that a contact impact force is within a permissible range from the very start of movement from the position corresponding to the contact state of stopper 37a, a longer time is required for control shaft 28 to rotate to the position corresponding to the contact state of stopper 37b. In contrast, when the output of the sensor related to the position corresponding to the contact state of stopper 37a is already learned, engine control unit 9 is able to estimate what level of the output of angle sensor 36 corresponds to the contact state of stopper 37b.

Thus, engine control unit 9 starts to limit the operation variable of electric motor 31 to a lower level at a timing during the course of angular change sensed based on the change of the rotation angle from the position corresponding to the contact state of stopper 37a (based on the change of the output value of angle sensor 36). In this way, engine control unit 9 executes buffer control for reducing the contact impact force applied to stopper 37b while responsively moving stopper 37b to the position corresponding to the contact state of stopper 37b.

That is, since stopper 37b is not expected to reach the contact state within a predetermined angular range immediately after control shaft 28 starts to move from the position corresponding to the contact state of stopper 37a, engine control unit 9 rotates control shaft 28 at a torque higher than a maximum permissible torque at which stopper 37b comes into the contact state (at a speed higher than a maximum permissible speed) so as to shorten the learning time (move time).

Moreover, based on a change in the rotation angle from the position corresponding to the contact state of stopper 37a, engine control unit 9 detects that the rotation angle of control shaft 28 enters an angular range within which stopper 37b can possibly reach the contact state. Upon such detection, engine control unit 9 starts to limit and reduce the operation variable of electric motor 31 such that the motor torque becomes equal to or less than the maximum permissible torque at which stopper 37b comes into the contact state (such that the rotation speed becomes equal to or less than the maximum permissible speed).

Engine control unit 9 executes this buffer control so as to prevent stopper 37b from being deflected and deformed by a contact impact force while shortening the time required to rotate control shaft 28 from the position corresponding to the contact state of stopper 37a to the position corresponding to the contact state of stopper 37b (shortening the learning time for stopper 37b).

While engine control unit 9 rotates control shaft 28 toward the position corresponding to the contact state of stopper 37b, the operation proceeds to step S107. In step S107, similarly to step S104, engine control unit 9 determines whether or not the output of angle sensor 36 is maintained substantially constant, thereby detecting whether or not stopper 37b is settled in the contact state.

Until determining that the output of angle sensor 36 is maintained substantially constant, engine control unit 9 returns to step S106 and continues to control driving of electric motor 31 for bringing stopper 37b to the contact state.

When engine control unit 9 determines that stopper 37b becomes settled in the contact state and the output of angle sensor 36 becomes maintained substantially constant, the operation proceeds to step S108. In step S108, engine control unit 9 stores the thus maintained output value of angle sensor 36 as an output of the sensor related to the position corresponding to the contact state of stopper 37b.

As described above, engine control unit 9 first learns an output value of the sensor related to the position corresponding to the contact state of stopper 37a, and then learns an output value of the sensor related to the position corresponding to the contact state of stopper 37b. Based on the learned values, engine control unit 9 corrects the correlation between the output of angle sensor 36 and the angular position of control shaft 28 (actual compression ratio), and controls electric motor 31 based on the output of angle sensor 36.

The buffer control in step S106 will be described in more detail below.

The time chart of FIG. 4 is a chart for describing an example of buffer control of changing a limit value (upper limit value) CL for an electric current command value for electric motor 31.

Engine control unit 9 ensures that the electric current command value for electric motor 31 does not exceed the electric current limit value CL by setting the electric current command value to the electric current limit value CL when otherwise the electric current command value will exceed the electric current limit value CL.

Figure 5A:
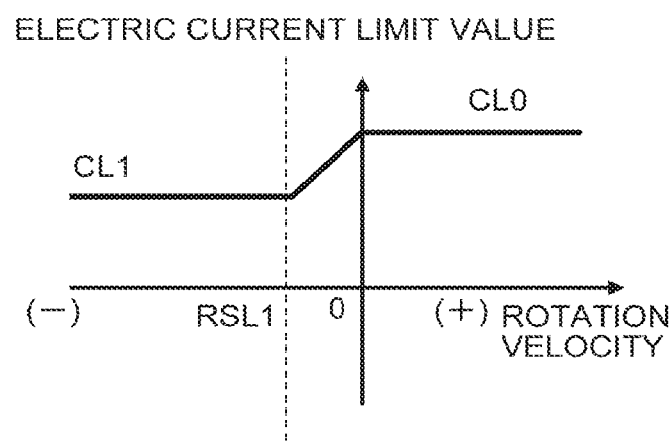
FIGS. 5A and 5B are views illustrating examples of electric current limit values used during first and second learning periods according to an embodiment of the present invention.

During a first learning period (early period of movement) engine control unit 9 uses the electric current limit value CL having characteristics illustrated in FIG. 5A. As illustrated in FIG. 4, the first learning period starts at time t0, at which learning starts, and ends at time t2, at which the rotation angle of control shaft 28 with respect to the position corresponding to the contact state of stopper 37a reaches a predetermined angle θα. At time t1 in the middle of the first learning period, stopper 37a is settled in the contact state.

Figure 5B:
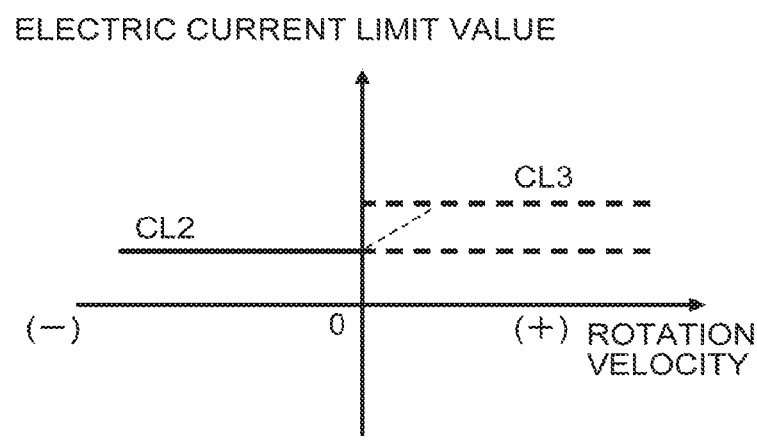

On the other hand, during a second learning period (late period of movement), engine control unit 9 uses the electric current limit value CL having characteristics illustrated in FIG. 5B. The second learning period starts at time t2, at which a rotation angle (angle change amount) Δθ of control shaft 28 with respect to the position corresponding to the contact state of stopper 37a reaches the predetermined angle θα, and ends upon completion of the stopper position learning for stopper 37b.

Engine control unit 9 identifies the rotation angle Δθ based on the amount of change in the output of angle sensor 36 measured relative to the output value of the sensor that is related to the position corresponding to the contact state of stopper 37a.

That is, based on the amount of change in the output of angle sensor 36 measured relative to the output value of the sensor (the learned value) that is related to the position corresponding to the contact state of stopper 37a, engine control unit 9 identifies at which timing to change the electric current limit value CL. At the identified change timing, engine control unit 9 changes the electric current limit value CL.

Here, the electric current limit value CL illustrated in FIG. 5B is smaller than the electric current limit value CL illustrated in FIG. 5A. Accordingly, the motor torque during the second learning period is limited to a lower level than during the first learning period.

In other words, a relatively high motor torque is generated so as to responsively move control shaft 28, from the initial position to the position corresponding to the contact state of relatively high-rigidity stopper 37a, and from the position corresponding to the contact state of stopper 37a to the position where the rotation angle reaches the predetermined angle θα relative to this stopper contact position. On the other hand, in order to ensure that a contact impact force applied to stopper 37b is within the permissible range, the motor torque is limited to a lower level than at the beginning of the movement, from the position where the rotation angle reaches the predetermined angle θα relative to the position corresponding to the contact state of stopper 37a to the position corresponding to the contact state of stopper 37b.

Here, different electric current limit values CL are allocated depending on the rotation speed and the rotational direction of electric motor 31. As used herein, the rotation velocity toward the position corresponding to the contact state of stopper 37a is assumed to be positive, whereas the rotation velocity toward the position corresponding to the contact state of stopper 37b is assumed to be negative.

The electric current limit value CL of FIG. 5A used in the first learning period has the following characteristics: The limit value in the negative rotation velocity is set lower than the limit value in the positive rotation velocity. The limit value is maintained at a constant value CL0 over the entire range of positive rotation velocity. On the other hand, in the range of negative rotation velocity, the limit value, which is set to the same value as the limit value CL0 when the rotation velocity is zero, decreases as the absolute value of the rotation velocity increases, and is maintained at a constant value CL1 when the absolute value of the rotation velocity is equal to or greater than that of a predetermined velocity RSL1.

However, the buffer control may be configured such that no electric current limitation is performed during the first learning period.

The electric current limit value in the negative rotation velocity in FIG. 5A is used when rotating control shaft 28 from the position corresponding to the contact state of stopper 37a toward the position corresponding to the contact state of stopper 37b. Accordingly, the limit value in the negative rotation velocity has the following characteristics: At the start of movement from the position corresponding to the contact state of stopper 37a, the limit value CL greater than the limit value CL1 is used in order to secure a significant starting current. Then, by the time immediately before reaching the position corresponding to the contact state of stopper 37b, the limit value is reduced to the electric current limit value CL1 that ensures maintaining an expected rotation speed.

Here, due to low levels of friction and/or the like, a motor torque required to start the motor is sometimes not much higher than the torque required while the motor rotates. In such a case, the limit value may be constantly set to the limit value CL1 over the entire range of negative rotation velocity, so that the limit value CL1 is used even at the start of movement from the position corresponding to the contact state of stopper 37a.

The electric current limit value CL0 in the positive rotation velocity in FIG. 5A is used when bringing stopper 37a into the contact state. Accordingly, the limit value CL0 in the positive rotation velocity is set higher than the electric current limit value CL1 to allow control shaft 28 to be driven at a higher torque at that time, since stopper 37a, which has a relatively high rigidity, has a higher impact resistance.

On the other hand, the electric current limit value in FIG. 5B is used during the second learning period, that is, used when bringing stopper 37b into the contact state. Accordingly, the electric current limit value in FIG. 5B is set lower than the limit value CL1 in FIG. 5A in both the positive and negative rotation velocity ranges.

A limit value CL2 in the negative rotation velocity in FIG. 5B is used when bringing low-rigidity stopper 37b into the contact state. Accordingly, the limit value CL2 is set to a value that is smaller than the limit value CL1 and that ensures that the torque is controlled equal to or less than the maximum permissible torque at which stopper 37b comes into the contact state.

That is, when rotating control shaft 28 from the position corresponding to the contact state of stopper 37a toward the position corresponding to the contact state of stopper 37b, the electric current limit value CL is controlled as follows: At the beginning (during the first learning period), the electric current limit value CL is set to the limit value CL1, thereby generating a motor torque that ensures the highly responsive rotation of control shaft 28 toward the position corresponding to the contact state of stopper 37b. During the second learning period, in which control shaft 28 is estimated to come sufficiently close to the position corresponding to the contact state of stopper 37b, the electric current limit value CL is changed from the limit value CL1 to the smaller limit value CL2 so that the motor torque is reduced to ensure that a contact impact force applied to stopper 37b falls within the permissible range.

A limit value CL3 in the positive rotation velocity in FIG. 5B is used when rebound (change in rotation to move away from the position corresponding to the contact state of stopper 37b toward the position corresponding to the contact state of stopper 37a) occurs due to a contact impact applied to stopper 37b. Accordingly, the electric current limit value CL3 is set to an intermediate value between the limit value CL1 and the limit value CL2 so as to generate a motor torque for recovering the rebound (CL2<CL3<CL1). As indicated by dotted line in FIG. 5B, the limit value CL has the characteristics of gradually increasing from CL2 to CL3 as the rotation velocity increases from zero in the positive direction, and then being maintained at the limit value CL3 after reaching the limit value CL3.

Alternatively, as indicated by dotted line in FIG. 5B, the limit value CL may have the characteristics of being set constantly to the limit value CL2 in both the positive and negative rotation velocity ranges. That is, the electric current limit value during the second learning period may constantly set to the limit value CL2 (CL3=CL2).

Figure 6:
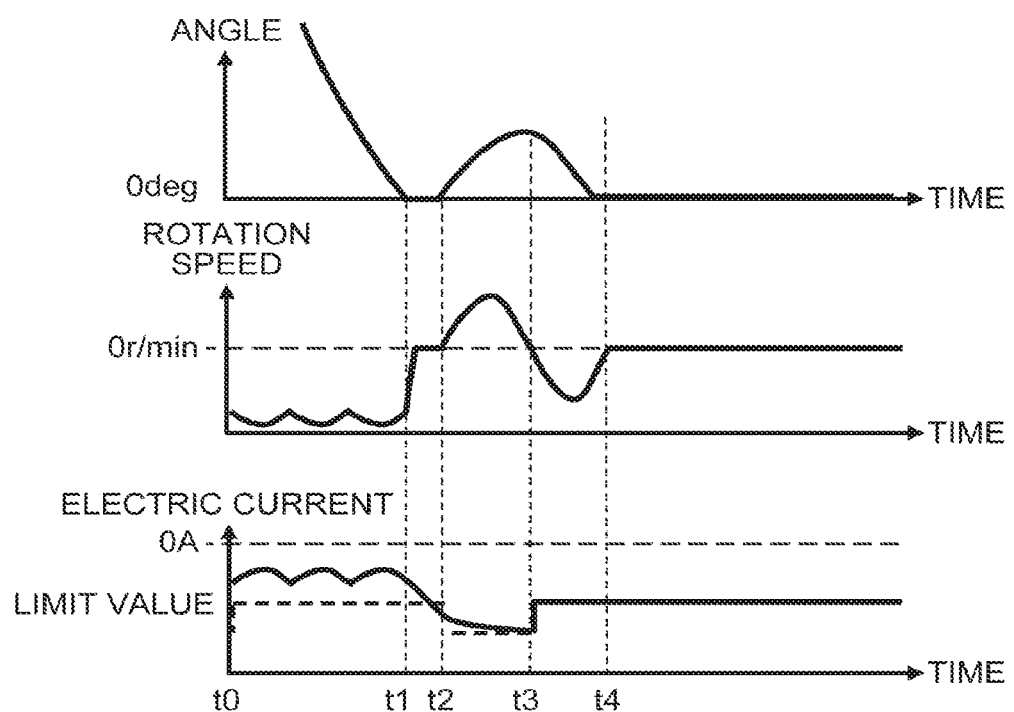
FIG. 6 is a time chart illustrating an example of changes in rotation angle, a rotational frequency, and a motor current during stopper position learning according to an embodiment of the present invention.

The time chart of FIG. 6 illustrates an example of changes in the angle of control shaft 28, the rotation speed of control shaft 28 (revolutions per minute, rpm), the motor current, and the electric current limit value CL for the motor, when the electric current limit value CL of FIG. 5B is used during the second learning period.

In FIG. 6, during the period from time t0 to time t1 until the angular position of control shaft 28 reaches the position corresponding to the contact state of stopper 37b, and during the period from time t1 to time t2 in which stopper 37b maintains the contact state, the electric current command value is limited by the electric current limit value CL2. The electric current limit value CL2 allows limiting the motor torque to a value that ensures that a contact impact force falls within the permissible range. Thus, a contact impact force applied to stopper 37b is sufficiently mitigated.

In a period from time t2, rebound occurring when stopper 37b reaches the contact state causes control shaft 28 to start rotating in the positive direction toward the position corresponding to the contact state of stopper 37a. In response, the electric current limit value CL is changed from the electric current limit value CL2 to the greater electric current limit value CL3 so as to generate a motor torque for inverting the rotational direction into the negative direction toward stopper 37b.

At time t3 when the rotational direction of control shaft 28 returns to the negative direction toward the position corresponding to the contact state of stopper 37b, the electric current limit value CL is set back to the electric current limit value CL2 so as to limit the contact impact force applied to stopper 37b.

When stopper 37b maintains the contact state after reaching the contact state at time t4, the output value of angle sensor 36 at that time is learned as an output of the sensor corresponding to the contact state of stopper 37b.

Here, as illustrated in FIG. 5B, the electric current limit value CL may be set to the limit value CL2 during the entire second learning period when control shaft 28 rotates in the negative direction. Alternatively, however, the limit value in the low rotation velocity range in the negative direction may be set still lower as illustrated in FIG. 7.

Figure 7:
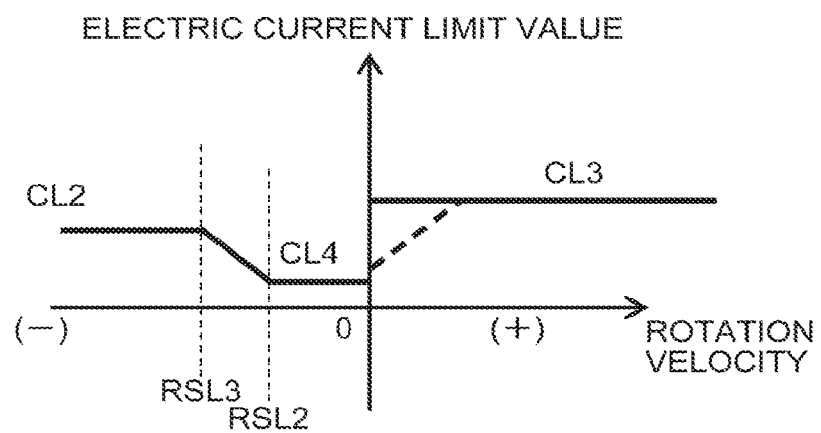
FIG. 7 is a view illustrating an example of electric current limit values used during a second learning period according to an embodiment of the present invention.

The electric current limit value CL illustrated in FIG. 7 to be used during the second learning period has the following characteristics in the negative rotational direction toward stopper 37b: During a period in which the rotation velocity changes from zero to a predetermined rotation velocity RSL2, the electric current limit value CL is set to an electric current limit value CL4 (CL4<CL2<CL3<CL1), which is still lower than the electric current limit value CL2. During a period in which the rotation velocity changes from the predetermined rotation velocity RSL2 to a predetermined rotation velocity RSL3, the electric current limit value CL is gradually increased from the electric current limit value CL4 to the electric current limit value CL2 along with an increase in the rotation speed. During a period in which the absolute value of the rotation speed is equal to or greater than that of the predetermined rotation velocity RSL3, the electric current limit value CL is maintained at the electric current limit value CL2.

The electric current limit value CL4 used in the low rotation range in the negative rotational direction is adapted based on the permissible torque at which stopper 37b comes into the contact state, thus allowing further reduction of the contact impact applied to stopper 37b.

Similarly to FIG. 5B, in the characteristics of FIG. 7, the electric current limit value CL3 (CL2<CL3<CL1) is used in the positive rotation velocity range.

When engine control unit 9 rotates control shaft 28 from the position corresponding to the contact state of stopper 37a toward the position corresponding to the contact state of stopper 37b, engine control unit 9 may change the electric current limit value (correspondence table between rotation speed and electric current limit value) twice or more in accordance with an increase in the angle change amount (amount of movement) from the position corresponding to the contact state of stopper 37a.

FIG. 8 and FIGS. 9A to 9C illustrate the buffer control for changing the electric current limit value twice. In this buffer control, the first round of changing the electric current limit value (changing the correspondence table between rotation speed and electric current limit value) is executed at the time point when the angle change amount Δθ relative to the position corresponding to the contact state of stopper 37a reaches a first angle θ1. The second round of changing the electric current limit value (changing the correspondence table between rotation speed and electric current limit value) is executed at the time point when the angle change amount Δθ reaches a second angle θ2 (θ1<θ2).

Figure 9A:
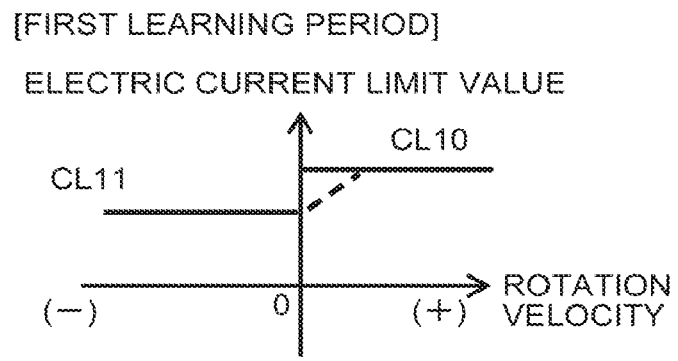
FIGS. 9A to 9C are views illustrating examples of current limit values used during first to third learning periods according to an embodiment of the present invention.

During the first learning period (starting period in the negative direction) in which control shaft 28 rotates from the position corresponding to the contact state of stopper 37a to the position at which the angle change amount Δθ reaches the first angle θ1 as illustrated in FIG. 8, the electric current limit value CL having the characteristics as illustrated in FIG. 9A is used.

During the first learning period, an electric current limit value CL11 used in the negative rotation velocity is set to a value that allows securing a sufficient electric current for starting to rotate the motor in the negative direction from the position corresponding to the contact state of stopper 37a. On the other hand, an electric current limit value CL10 used in the positive rotation velocity is set to be greater than the electric current limit value CL11.

Note that the limitation according to the electric current limit value CL is not necessarily performed in the positive rotation velocity range during the first learning period.

Figure 9B:
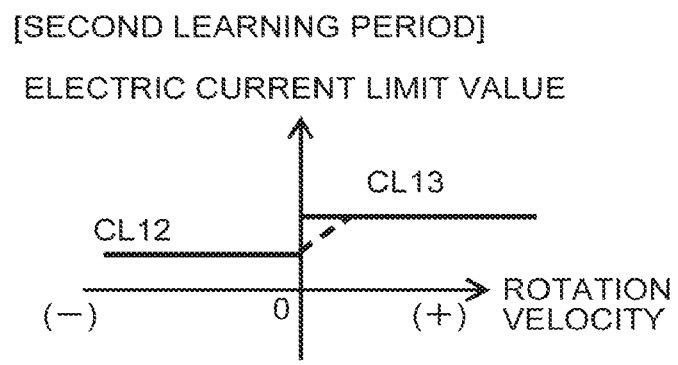

During the second learning period in which the angle change amount $\Delta\theta$ changes from the first angle $\theta 1$ to the second angle $\theta 2$ as illustrated in FIG. 8, the electric current limit value CL having the characteristics illustrated in FIG. 9B is used.

The second angle $\theta 2$ is set such that the second learning period corresponds to the angular range within which stopper 37*b* is not expected to reach the contact state in consideration of variation in the angular interval between the position of stopper 37*a* and the position of stopper 37*b*. During the second learning period, control shaft 28 is quickly rotated toward stopper 37*b*, and thus, the learning time is shortened.

To achieve this, an electric current limit value CL12 (CL12<CL11) in the negative direction during the second learning period is set to a value that ensures maintaining the expected rotation velocity, that is, set to a value equivalent to the electric current limit value CL1 illustrated in FIG. 5A.

In addition, an electric current limit value CL13 in the positive direction during the second learning period is adapted so as to limit reacceleration toward stopper 37*b* upon rebound from the contact state of the stopper 37*b*, thus set to satisfy CL12<CL13<CL10.

Here, as described above, the second learning period corresponds to the angular range within which stopper 37*b* is not expected to reach the contact state even though there is positional variation in stoppers 37*a* and 37*b*. Accordingly, the electric current limit value CL12 may be used in both the negative rotational direction and the positive rotational direction.

Figure 9C:
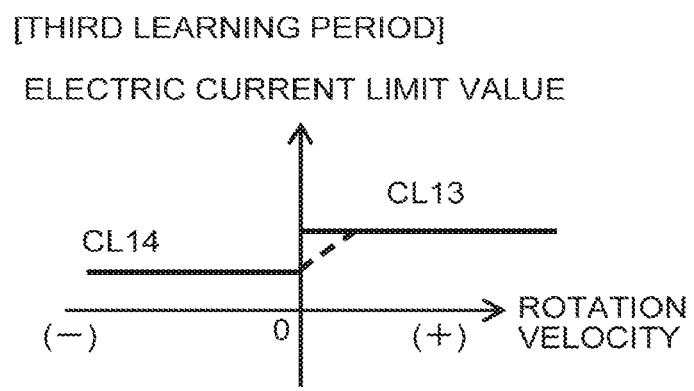

As illustrated in FIG. 8, in a third learning period after the angle change amount $\Delta\theta$ reaches the second angle $\theta 2$, the electric current limit value CL having the characteristics illustrated in FIG. 9C is used.

Since stopper 37*b* is brought into the contact state during the third learning period, an electric current limit value CL14 (CL14≤1 CL12) equivalent to the electric current limit value CL4 illustrated in FIG. 7 is used in the negative rotation velocity range, and an electric current limit value equivalent to the electric current limit value CL13 in the positive direction during the second learning period is used in the positive rotation velocity range.

As described above, when the correspondence table between rotation speed and electric current limit value is changed twice, so that the movement from the position corresponding to the contact state of stopper 37*a* to the position corresponding to the contact state of stopper 37*b* is divided into early, middle, and late periods, the following advantages are achieved. In the early period of movement, it is possible to responsively start the motor so as to rotate control shaft 28 from the position corresponding to the contact state of stopper 37*a* toward the position corresponding to the contact state of stopper 37*b*. In the subsequent middle period of movement, it is possible to rotate control shaft 28 as fast as possible to the vicinity of the position corresponding to the contact state of stopper 37*b*. In the late period of movement, it is possible to sufficiently limit a torque at which stopper 37*b* comes into the contact state, thus controlling a contact impact force within the permissible range.

As an alternative, the electric current control value CL may be changed in accordance with the rotational direction and the angle change amount $\Delta\theta$ instead of allocating different electric current limit values CL depending on the rotation velocity of control shaft 28. As another alternative, the electric current control value CL is changed to a smaller value along with an increase in the angle change amount $\Delta\theta$ instead of allocating different electric current control values CL depending on the rotation speed and the rotational direction.

Here, as described above, the angle change amount $\Delta\theta$ is the rotation angle of control shaft 28 relative to the position corresponding to the contact state of stopper 37*a*.

The electric current limit value CL may be corrected in accordance with the deviation between the target rotation velocity and the actual rotation velocity. This makes it possible to improve the control accuracy of the rotation velocity of control shaft 28 when rotating control shaft 28 toward the position corresponding to the contact state of stopper 37*b*.

Moreover, when the angle change amount $\Delta\theta$ enters the angular range within which stopper 37*b* can possibly reach the contact state, that is, in the late period of movement, which corresponds to the second learning period of FIG. 4 or the third learning period of FIG. 8, the initial value of the electric current control value CL may be set according to the increase in the angle change amount $\Delta\theta$, and, after that, the electric current control value CL may be set to a smaller value every time the angle change amount $\Delta\theta$ increases by a unit angle (or every lapse of a predetermined unit time).

Incidentally, the control for preventing a command value for motor current from exceeding the electric current limit value CL might permit the electric current value actually flowing through electric motor 31 when either stopper reaches the contact state to exceed the electric current limit value CL due to an induced voltage change or the like. Accordingly, such control has a risk of allowing generation of an excessive motor torque when the stopper reaches the contact state.

To avoid this, in the second learning period of FIG. 4 or the third learning period of FIG. 8, engine control unit 9 may execute voltage limiting processing for limiting the motor's applied voltage to an upper limit value or less, in addition to the electric current limiting processing.

Figure 10:
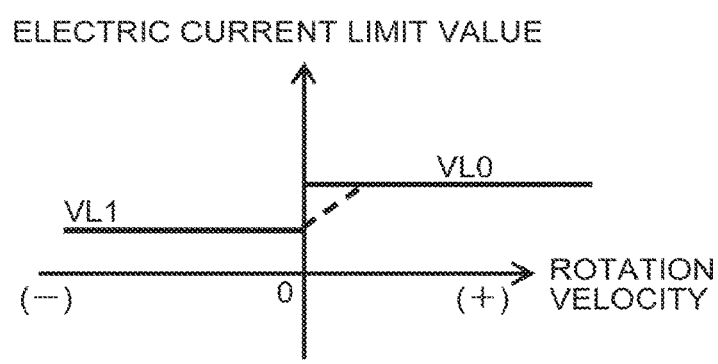
FIG. 10 is a view illustrating an example of limit voltage values used during a third learning period according to an embodiment of the present invention.

FIG. 10 illustrates an example of the characteristics of a limit voltage value (upper limit voltage value) VL used for limiting the motor's applied voltage during the third learning period of FIG. 8. The characteristics of limit voltage value (upper limit voltage value) VL of FIG. 10 may also be used during the second learning period of FIG. 4.

In FIG. 10, in the positive rotation velocity range toward relatively high-rigidity stopper 37*a*, a limit voltage value (upper limit value for applied voltage) VL0 is set to a voltage corresponding to the electric current limit value CL3 or CL13. On the other hand, in the negative rotation velocity range toward relatively low-rigidity stopper 37*b*, a limit voltage value VL1 (VL1<VL0) is set to a voltage corresponding to the maximum permissible current value (maximum permissible torque) for the stopper contact state.

Figure 11:
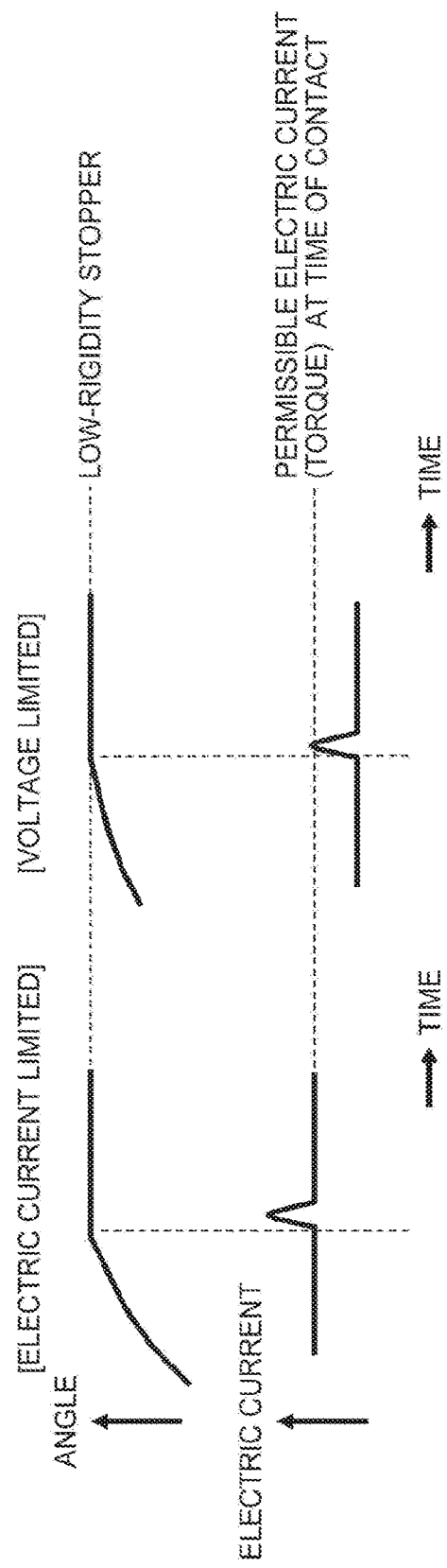
FIG. 11 is a time chart illustrating an example of changes in a rotation angle and an electric current when current limitation and voltage limitation are performed during stopper position learning according to an embodiment of the present invention.

As illustrated in FIG. 11, limiting the motor's applied voltage below the limit voltage value VL having the above-described characteristics makes it possible to prevent the motor current from exceeding the electric current limit value corresponding to the maximum permissible torque when either stopper reaches the contact state, even though such voltage limitation reduces the responsiveness of the angular change while control shaft 28 rotates toward the stopper contact position.

Here, while bringing low-rigidity stopper 37*b* into the contact state, the motor's applied voltage may be limited to a lower level (the limit voltage value VL may be changed to a smaller value) at the timing when the angle change amount becomes a predetermined value, instead of changing the limit value for the motor current.

Hereinabove, the details of the present invention have been specifically described with reference to preferred embodiments. However, it is apparent for those skilled in the art that various modifications can be made based on the essential technical concept and teachings of the present invention.

For example, the arrangement of the two stoppers having different rigidity is not limited to the foregoing in which the stoppers are provided respectively to two different rotational bodies (control shaft 28, and output shaft 32a of decelerator 32). The present invention may also be applied to a drive mechanism in which two stoppers having different rigidity are provided to a single rotational body.

Figure 12A:
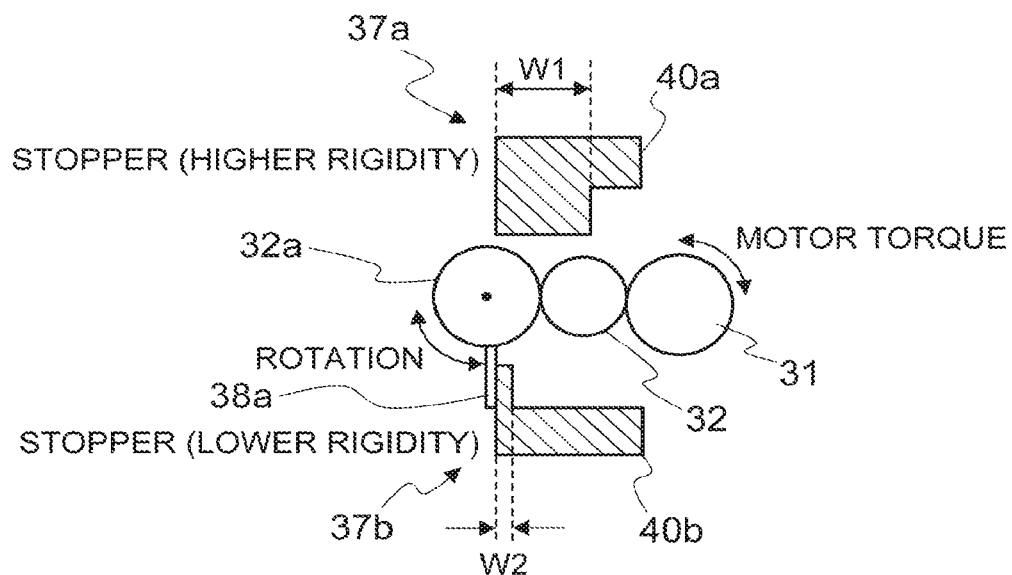
FIGS. 12A and 12B are views illustrating a stopper structure of a variable compression ratio mechanism according to an embodiment of the present invention.
Figure 12B:
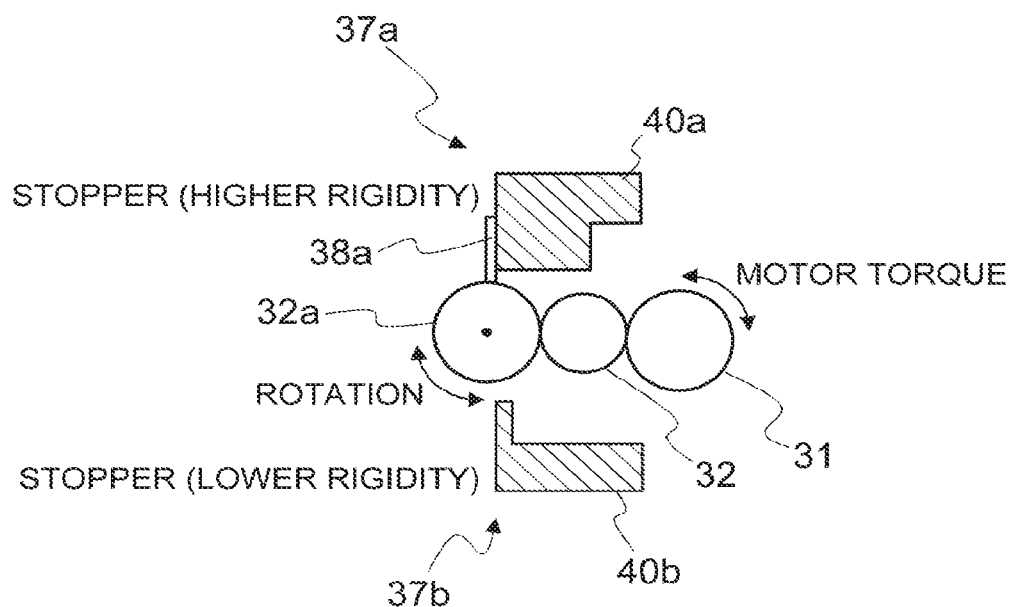

In FIGS. 12A and 12B, one stopper 37a includes projection part 38a and a first engagement part 40a. Projection part 38a protrudes from the outer circumference of output shaft 32a of decelerator 32. When output shaft 32a rotates clockwise, projection part 38a eventually comes into contact with first engagement part 40a near the twelve o'clock position in FIGS. 12A and 12B. The other stopper 37b, which shares projection part 38a with stopper 37a, includes a second engagement part 40b. When output shaft 32a rotates counterclockwise, projection part 38a eventually comes into contact with second engagement part 40b near the six o'clock position in FIGS. 12A and 12B.

According to the configuration, the angular range of movability of output shaft 32a is also set to an angular range between the angular position corresponding to the contact state of stopper 37a and the angular position corresponding to the contact state of stopper 37b.

Here, a thickness w1 of first engagement part 40a in the rotational direction of projection part 38a is greater than a thickness w2 of second engagement part 40b in the rotational direction of projection part 38a. Thus, stopper 37a including first engagement part 40a and projection part 38a has a higher rigidity than stopper 37b including second engagement part 40b and projection part 38a.

When the stopper structure illustrated in FIGS. 12A and 12B is employed, since stopper 37a is more rigid than stopper 37b, the stopper position learning is executed as follows: First, engine control unit 9 brings stopper 37a (first engagement part 40a and projection part 38a) into the contact state and learns the output of angle sensor 36 related to the position corresponding to the contact state of stopper 37a.

Subsequently, engine control unit 9 rotates control shaft 28 toward the position corresponding to the contact state of stopper 37b, while changing the limit value for the operation variable (electric current and/or voltage) of the motor so as to limit and reduce the operation variable in accordance with the angular change relative to the position corresponding to the contact state of stopper 37a. This makes it possible to responsively rotate control shaft 28 toward the position corresponding to the contact state of stopper 37b while limiting a contact impact force applied to stopper 37b within a permissible range.

In the examples illustrated in FIGS. 12A and 12B, two stoppers 37a and 37b are provided to output shaft 32a. However, two stoppers 37a and 37b may be provided to control shaft 28, instead.

In addition, the drive mechanism is not limited to variable compression ratio mechanism 2. It is apparent that, for example, the present invention may also be applied to a variable valve mechanism for changing the lift characteristics of the intake valves or the exhaust valves of the internal combustion engine depending on the angle of the control shaft.

Moreover, the moving body included in the drive mechanism is not limited to a shaft rotating around its center axis. For example, the present invention may also be applied to a drive mechanism having a structure for using stoppers to limit the back-and-forth linear movement of a rack, which serves as the moving body, of a rack-and-pinion.

Here, technical concepts which can be grasped from the above embodiments will be disclosed below.

According to an aspect, there is provided a control device for a vehicle drive mechanism including a moving body which is movably supported, two stoppers, each of which defines an end of a movability range of the moving body, an actuator which drives the moving body in a moving direction, and a sensor which senses a position of the moving body. The control device comprises a learning unit that learns an output of the sensor corresponding to a contact state of each of the two stoppers. The learning unit executes the learning for a high-rigidity stopper of the two stoppers prior to the learning for a low-rigidity stopper of the two stoppers.

In a preferable aspect of the control device, when the low-rigidity stopper is brought into the contact state, the learning unit limits an operation variable of the actuator to a lower level along with an increase in an amount of change in the output of the sensor from the contact state of the high-rigidity stopper.

In another preferable aspect, the learning unit limits the operation variable for moving the moving body toward the low-rigidity stopper to a lower level than the operation variable for moving the moving body toward the high-rigidity stopper.

In still another preferable aspect, when the low-rigidity stopper is brought into contact, the learning unit changes an upper limit value of the operation variable to a smaller value in accordance with an increase in the amount of change in the output of the sensor from the contact state of the high-rigidity stopper.

In still another preferable aspect, the actuator is a motor, and the learning unit limits at least one of a current and an applied voltage of the motor.

In still another preferable aspect, the high-rigidity stopper is a stopper, closer to the actuator, of the two stoppers.

According to another aspect, there is provided a control method for a vehicle drive mechanism including a moving body which is movably supported, two stoppers, each of which defines an end of a movability range of the moving body, an actuator which drives the moving body in a moving direction, and a sensor which senses a position of the moving body. The control method comprises: moving the moving body toward a high-rigidity stopper of the two stoppers; learning an output of the sensor corresponding to a contact state of the high-rigidity stopper; moving the moving body toward a low-rigidity stopper of the two stoppers from the contact state of the high-rigidity stopper; limiting, to a lower level, an operation variable of the actuator for moving the moving body toward the low-rigidity stopper from the contact state of the high-rigidity stopper along with an increase in an amount of change in the output of the sensor from the contact state of the high-rigidity stopper; learning the output of the sensor corresponding to the contact state of the low-rigidity stopper; and controlling the actuator based on a learned value of the output of the sensor.

REFERENCE SYMBOL LIST 1 internal combustion engine
2 variable compression ratio mechanism (drive mechanism)

9 engine control unit (control device)
28 control shaft (moving body)
31 electric motor (actuator)
32 decelerator
36 angle sensor
37a stopper (higher rigidity)
37b stopper (lower rigidity)

The invention claimed is:

1. A control device for a vehicle drive mechanism including a moving body which is movably supported, two stoppers, each of which defines an end of a movability range of the moving body, an actuator which drives the moving body in a moving direction, and a sensor which senses a position of the moving body, the control device comprising:
a learning unit that learns an output of the sensor corresponding to a contact state of each of the two stoppers,
wherein the learning unit executes learning for a first stopper of the two stoppers prior to learning for a second stopper of the two stoppers, the first stopper having a higher rigidity than the second stopper,
wherein, while the moving body is brought into contact with the first stopper, an operation variable of the actuator is limited so as not to exceed a first upper limit value,
wherein, while the moving body is brought into contact with the second stopper, the operation variable is limited so as not to exceed a second upper limit value, which is lower than the first upper limit value, and
wherein, while the moving body rebounds off the second stopper and moves toward the first stopper, the operation variable is limited so as not to exceed a third upper limit value, which is lower than the first upper limit value and greater than the second upper limit value.

2. The control device for a vehicle drive mechanism according to claim 1,
wherein the learning unit increases the third upper limit value along with an increase in speed in which the moving body moves toward the first stopper after rebounding off the second stopper.

3. The control device for a vehicle drive mechanism according to claim 1,
wherein the actuator is a motor, and
wherein, based on change in rotational direction of the motor, the learning unit detects that the moving body rebounds off the second stopper.

4. The control device for a vehicle drive mechanism according to claim 1,
wherein the actuator is a motor, and
wherein the learning unit limits at least one of a current and an applied voltage of the motor.

5. A control method for a vehicle drive mechanism including a moving body which is movably supported, two stoppers, each of which defines an end of a movability range of the moving body, an actuator which drives the moving body in a moving direction, and a sensor which senses a position of the moving body, the control method comprising:
bringing the moving body into contact with a first stopper of the two stoppers while limiting an operation variable of the actuator so as not to exceed a first upper limit value, the first stopper having a higher rigidity than a second stopper of the two stoppers;
learning an output of the sensor obtained in a state in which the moving body is in contact with the first stopper;
moving the moving body toward the second stopper from the state in which the moving body is in contact with the first stopper so as to bring the moving body into contact with the second stopper while limiting the operation variable so as not to exceed a second upper limit value, which is lower than the first upper limit value;
limiting the operation variable so as not to exceed a third upper limit value, which is lower than the first upper limit value and greater than the second upper limit value, while the moving body rebounds off the second stopper and moves toward the first stopper;
learning an output of the sensor obtained in a state in which the moving body is in contact with the second stopper; and
controlling the actuator based on the learned outputs of the sensor.

* * * * *